United States Patent
Call et al.

(10) Patent No.: US 11,260,887 B2
(45) Date of Patent: Mar. 1, 2022

(54) LOCOMOTIVE PARKING BRAKE

(71) Applicant: NEW YORK AIR BRAKE, LLC, Watertown, NY (US)

(72) Inventors: Derick Call, Evans Mills, NY (US); Carl Banks, Sackets Harbor, NY (US); Nicholas Van Derzee, Watertown, NY (US); Steven Michael Barnhart, Houghton, MI (US); James Lewis Vendlinski, Houghton, MI (US)

(73) Assignee: NEW YORK AIR BRAKE, LLC, Watertown, NY (US)

( * ) Notice: Subject to any disclaimer, the term of this patent is extended or adjusted under 35 U.S.C. 154(b) by 0 days.

(21) Appl. No.: 16/552,483

(22) Filed: Aug. 27, 2019

(65) Prior Publication Data
US 2019/0382037 A1 Dec. 19, 2019

Related U.S. Application Data

(62) Division of application No. 15/652,434, filed on Jul. 18, 2017, now Pat. No. 10,501,098.

(51) Int. Cl.
| | |
|---|---|
| *B61H 13/02* | (2006.01) |
| *B60T 17/22* | (2006.01) |
| *B60T 13/66* | (2006.01) |
| *B61H 13/04* | (2006.01) |
| *B60T 13/74* | (2006.01) |
| *B60T 7/10* | (2006.01) |

(52) U.S. Cl.
CPC ............ *B61H 13/02* (2013.01); *B60T 13/665* (2013.01); *B60T 17/228* (2013.01); *B61H 13/04* (2013.01); *B60T 7/107* (2013.01); *B60T 13/746* (2013.01)

(58) Field of Classification Search
CPC ...... B60T 7/107; B60T 17/228; B60T 13/746; B60T 13/665; B61H 13/02; B61H 13/04
See application file for complete search history.

(56) References Cited

U.S. PATENT DOCUMENTS

| | | | | |
|---|---|---|---|---|
| 1,491,753 A | * | 4/1924 | Sauvage ................ | B61H 13/04 188/156 |
| 3,943,761 A | * | 3/1976 | Shoberg ................. | G01L 5/102 73/862.474 |
| 5,469,941 A | * | 11/1995 | Horvath ................ | B61H 13/02 188/107 |

(Continued)

OTHER PUBLICATIONS

CA Office Action, App No. 3069900, dated Mar. 29, 2021, pp. 1-6.

*Primary Examiner* — Xuan Lan Nguyen
(74) *Attorney, Agent, or Firm* — Bond Schoeneck and King PLLC; David Nocilly

(57) ABSTRACT

A railway vehicle parking brake that can provide the appropriate tension to the braking system using a motor, a brake chain drum interconnected to the motor to take up or release a brake chain, a load arm deflects in response to tension in the brake chain, and a switch that is closed by the load arm when it deflects. A movable sheave interconnects the brake chain and the load arm and is positioned between the brake chain drum and a fixed sheave over which the brake chain is looped. A control method considers the position of the first switch to determine whether to the motor off when applying the brakes and the amount of current being drawn by the motor to determine whether to the motor off because of a system failure.

5 Claims, 6 Drawing Sheets

(56) References Cited

U.S. PATENT DOCUMENTS

| | | | | |
|---|---|---|---|---|
| 6,237,722 B1* | 5/2001 | Hammond | ............ | B60T 17/228 |
| | | | | 116/58 A |
| 6,427,811 B1* | 8/2002 | Wedge | ............ | B60T 7/16 |
| | | | | 188/162 |
| 6,474,451 B1* | 11/2002 | O'Brien, Jr. | ............ | B60T 7/042 |
| | | | | 188/1.11 R |
| 6,913,325 B2* | 7/2005 | Michel | ............ | B60T 13/665 |
| | | | | 188/162 |
| 8,584,551 B2* | 11/2013 | Gregar | ............ | G01L 5/102 |
| | | | | 74/506 |
| 8,839,915 B2* | 9/2014 | Vithani | ............ | B61H 13/02 |
| | | | | 188/1.11 E |
| 9,187,066 B2* | 11/2015 | Brabb | ............ | B60T 13/746 |
| 2013/0068570 A1* | 3/2013 | Wedge | ............ | B61H 1/00 |
| | | | | 188/57 |

* cited by examiner

LOCOMOTIVE PARKING BRAKE

BACKGROUND OF THE INVENTION

1. Field of the Invention

The present invention relates to locomotive parking brakes and, more specifically, to an electromechanical motorized locomotive parking brake with brake chain tension control.

2. Description of the Related Art

Locomotive parking brakes are used to set and hold the locomotive brakes in the applied position so that a locomotive remains parked when unattended. Due to the weight of a locomotive, the parking brake must be able to apply a large amount of force. As manual parking brakes require a user to either apply a significant force or operate a hand mechanism over a long period of time, there are numerous motorized versions that reduce the amount of manual labor involved. Due to need for both manual and motorized inputs, conventional locomotive parking brakes are usually designed so that use of the motorized function will not cause the manual mechanism to operate. For example, U.S. Pat. No. 1,491,753 discloses the use of a central gear or gears that may be selectively driven by either a motor or a hand wheel. Because the central gears are coupled to both the motor and the hand wheel via corresponding worm gears, operation of either the motor or the hand wheel will not cause the other input to be correspondingly operated through the common linkage as the two inputs are disengaged from each other. Other approaches avoid this consequence by disengaging the inputs from each other using a clutch than mechanically disconnects one of the inputs from the gears.

One problem associated with the use of a motorized locomotive parking brake is the need for feedback of how much force is being applied to the braking system by the motor. For example, the locomotive may be free to roll away in an uncontrolled fashion if the locomotive is parked on a grade an insufficient tension has been placed on the braking system. Correspondingly, if the motor applies too much tension the braking system may be damaged. The current approaches to solving this problem involve adding a load cell that continuously monitors brake chain tension or monitoring the input current to the motor as it is being operated. These approaches have drawbacks, however, as load cells are expensive and the motor current is not always an accurate gauge for the amount of force applied to the braking system. Accordingly, there is a need in the art for a motorized locomotive parking system that can provide the appropriate tension to the braking system.

BRIEF SUMMARY OF THE INVENTION

The present invention is a locomotive parking brake that can provide the appropriate tension to a railway vehicle braking system. The parking brake has a motor, a brake chain drum interconnected to the motor to take up or release a brake chain, a load arm that is deflectable in response to tension in the brake chain, and a switch that is to be closed by the load arm when it deflects in response to a predetermined amount of tension in the brake chain. A first sheave may be positioned to engage the brake chain and move away from the brake chain into the load arm in response to tension in the brake chain. A second sheave may be positioned apart from and in alignment with the brake chain drum to create a section of brake chain that engages the first sheave. A brake chain may be extended from a first end over the brake chain drum and between the first and second sheaves to a second end that is coupled to the brake rigging of the railway vehicle. A cam may be coupled to the first end of the brake chain for rotation when the brake chain is taken up or released by the brake chain. A second switch is associated with the cam so that when the brake chain drum drives the brake chain into a fully released position the cam will close the switch. For safety, the motor may be configured to provide a signal representing an amount of current being used by the motor as a check against failures.

The present invention also includes a method of controlling a motorized parking brake that begins with the step of checking for a first signal from a sensor indicating that a brake chain in under a predetermined level of tension. Next, a second signal is received from a motor indicating the amount of current being provided to the motor. Finally, the motor is stopped if the first signal is received or if the second signal indicates that the amount of current being provided to the motor is over a predetermined threshold. The method may also include the further step of stopping the motor if the amount of current being provided to the motor exceeds a second threshold that indicates a failure. The method may be implemented on a motorized parking brake having the motor, a brake chain drum interconnected to the motor to take up or release the brake chain, and a load arm that is deflected based on tension in the brake chain to close the switch. A first sheave may be used to engage the brake chain and moves away from the brake chain into the load arm in response to tension in the brake chain. A second sheave may be positioned apart from and in alignment with the brake chain drum to define a section of brake chain that engages the first sheave. A cam may be coupled to the first or slack end of the brake chain for rotation into engage with another switch when the brake chain is fully released.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
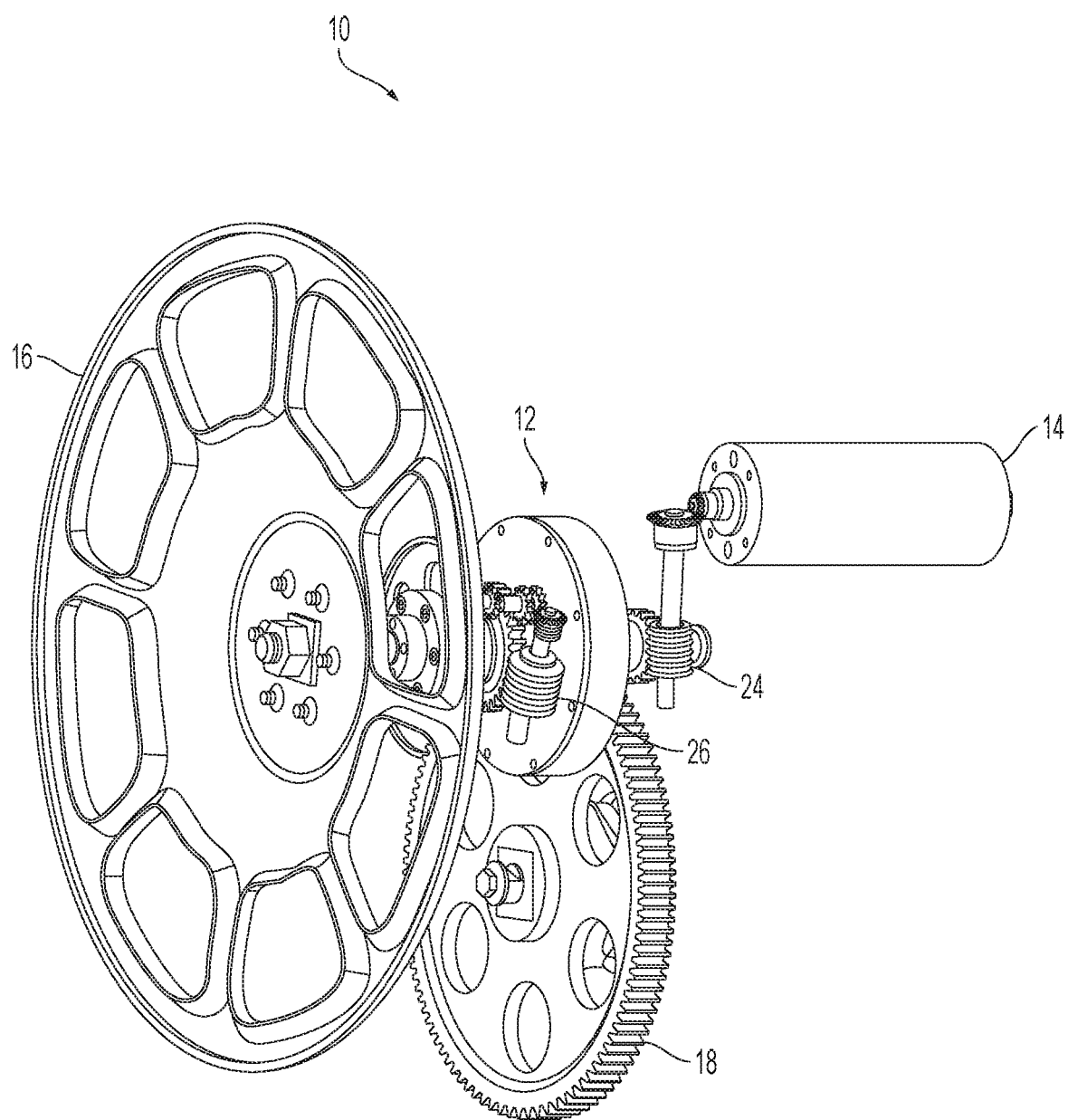
FIG. 1 is a first perspective view of the internal mechanism of a motorized locomotive parking brake according to the present invention.
Figure 2:
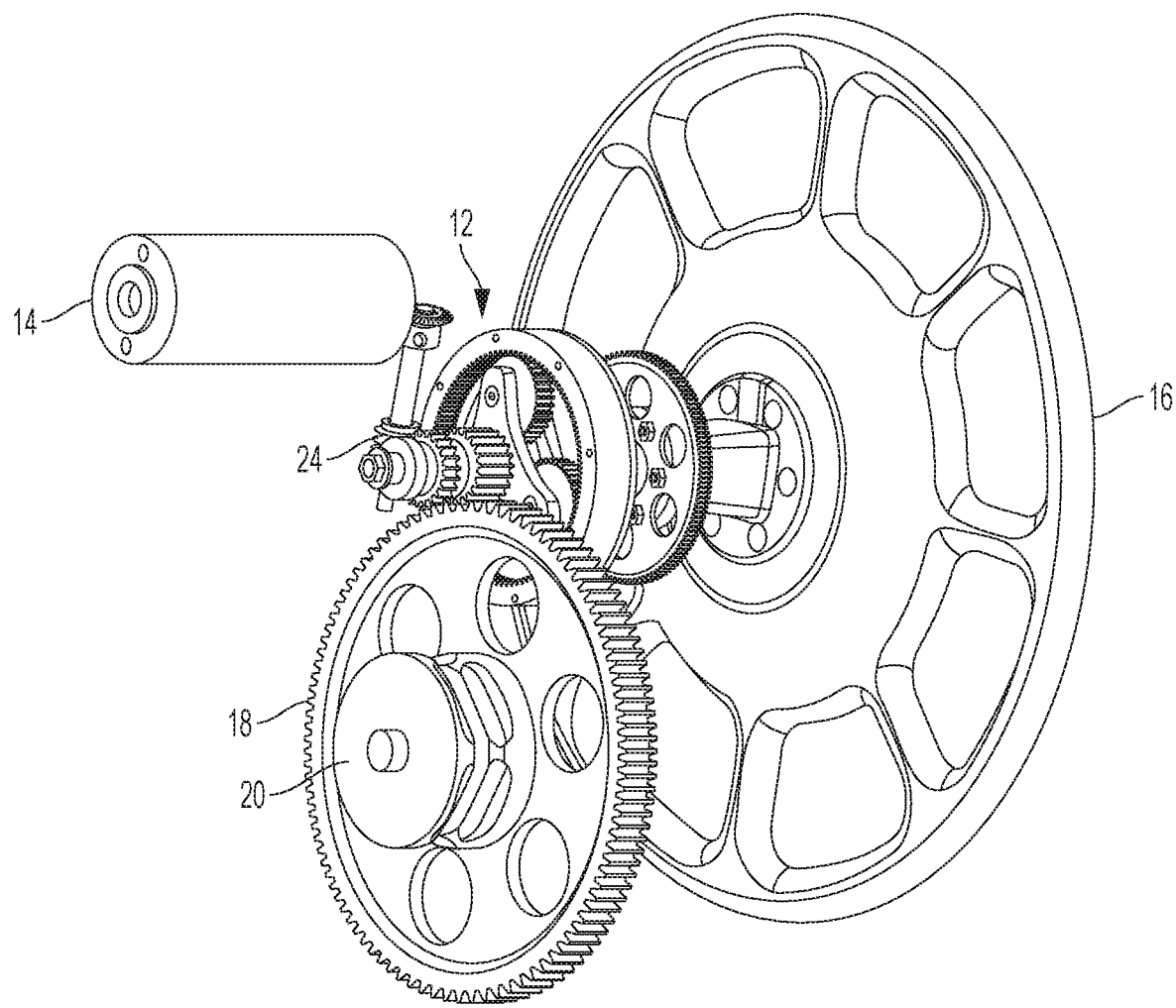
FIG. 2 is a second perspective view of the internal mechanism of a motorized locomotive parking brake according to the present invention.
Figure 3:
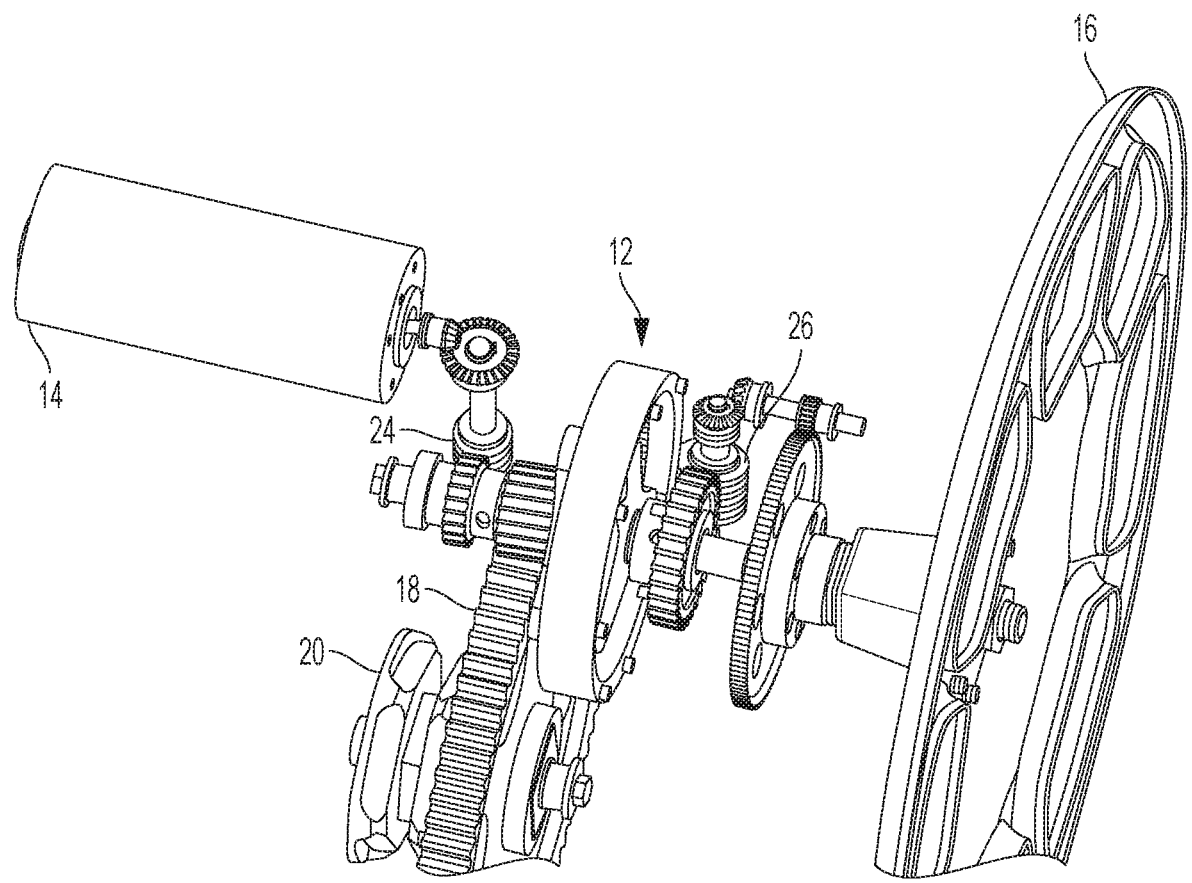
FIG. 3 is a third perspective view of the internal mechanism of a motorized locomotive parking brake according to the present invention.

Referring to the figures, wherein like numerals refer to like parts throughout, there is seen in FIGS. 1 through 3, a motorized locomotive parking brake 10 according to the present invention. Brake 10 comprises a central gear assembly 12 that can be selectively driven by either a motor 14 or a hand wheel 16 to rotate a take up gear 18 and associated brake chain drum 20. As is known in the art, brake chain drum 20 is coupled to a brake chain 22 so that brake chain 22 is taken up or released as drum 20 turns. Brake chain 22 is coupled at its other end to the brake rigging associated with the locomotive brakes so that the brakes of a railway vehicle are mechanically applied and released by movement of brake chain 22. Although described herein with respect to a locomotive parking brake, system 10 could be used in combination with a freight car parking brake, passenger car parking brake, or other rail car parking brake.

Motor 14 is interconnected to central gear assembly 12 by a first worm gear 24. Hand wheel 16 is interconnected to central gear assembly 12 by a second worm gear 26. Central gear assembly 12 may comprise a planetary gear set with motor 14, hand wheel 16, and take up gear 18 interconnected according to the desired gear reductions to the ring, planetary, and sun gears that comprise a conventional planetary gear set. It should be recognized that other gears or gear assemblies may be used to interconnect hand wheel 16 and motor 14 to take up gear 18. As first worm gear 24 and second worm gear 26 isolate the hand wheel 16 and motor 14 from each other, motor 14 is not engaged with hand wheel 16 and thus will not turn when hand wheel 16 is operated, and hand wheel 16 is not engaged with and thus will not turn when motor 14 is operated. Additionally, worm gears 24 and 26 prevent brake chain 22 from backdriving gear assembly 12 when placed under tension.

Figure 4:
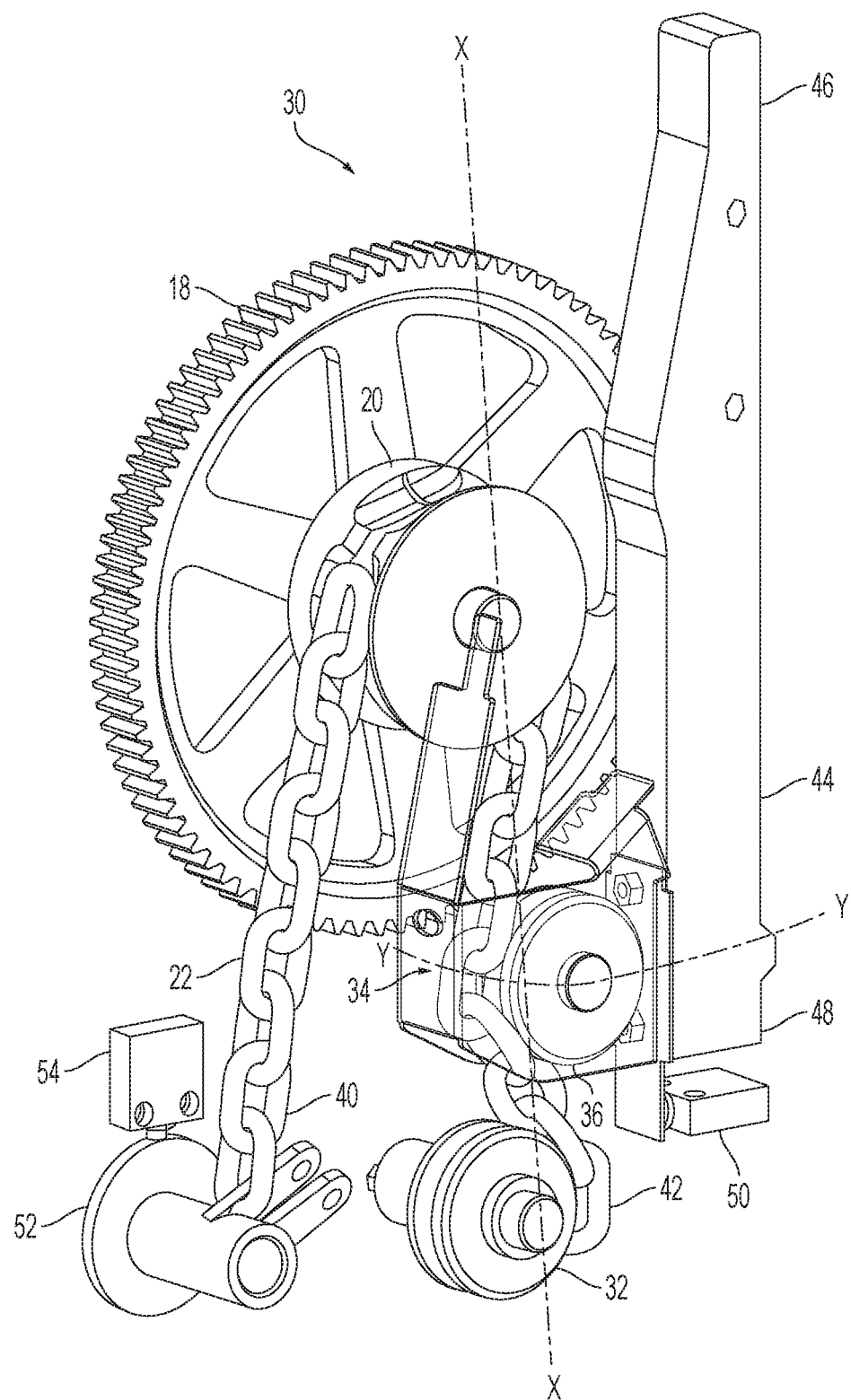
FIG. 4 is a perspective view of a brake chain tension system for a motorized locomotive parking brake according to the present invention.

Referring to FIG. 4, brake 10 may include a tension control assembly 30 associated with brake chain 22 for determine when sufficient force has been applied to brake chain 22. Tension control assembly 30 comprises a fixed sheave 32 spaced apart from winding drum 20 and aligned along a common axis X-X to define predetermined length 34 of brake chain 22 extending therebetween. A movable sheave 36 is positioned between with fixed sheave 32 and winding drum 20 and out of alignment with axis X-X. Movable sheave 36 is capable of movement along an axis Y-Y that is transverse to axis X-X. Brake chain 22 extends from a slack end 40 over drum 20 and past moveable sheave 36 and along fixed sheave 32 to a second end 42 that can be attached the railway vehicle brake rigging. Movable sheave 36 is positioned to engage predetermined length 34 of brake chain 22 so that, due to the misalignment of movable sheave 36 relative to axis X-X of fixed sheave 32 and winding drum 20, tension in brake chain 22 will impart a corresponding force to movable sheave 36 along arc Y-Y and away from axis X-X.

As seen in FIG. 4, movable sheave 36 is attached via a clevis 38 to the end of a load arm 44 that biases movable sheave 36 along arc Y-Y toward axis X-X and thus into engagement with brake chain 22. Load arm 44 is fixed at a first end 46 to define a pivot point and free at a second end 48 proximate to movable sheave 36 so that movement of movable sheave 36 along arc Y-Y in response to tension of brake chain 22 will cause a corresponding deflection of load arm 44. A limit switch 50 is positioned on the opposing side of load arm 44 from moveable sheave 36. Limit switch 50 may be a digital switch or an analog switch (such as an LVDT) that is configured to have movement corresponding to chain tension so that a supervisory controller could determine the amount of chain tension. Limit switch 50 is positioned so that a predetermined amount of deflection of load arm 44 will close limit switch 50 to produce an electronic signal indicating that sufficient brake chain tension has been reached. Load arm 44 can be configured to close switch 50 when a predetermined amount of tension has developed in brake chain 22 based on the amount of force required to deflect load arm 44 into contact with limit switch 50. For example, load arm 44 can be configured so that when 6,300 lbs of nominal chain tension is reached, brake chain 22 will exert a sufficient triggering force on movable sheave 36 that movable sheave 36 fully deflects free end 48 of load arm 44 until limit switch 50 is tripped, thus signaling that that locomotive brakes have be fully applied. As an example, load arm 44 that is made of aluminum and has a cross-section of 1.5 inches by 2 inches and a length of ten inches can be used to determine chain load according to displacement as set forth in Table 1 below:

TABLE 1

| Chain Load (lbs) | Arm Displacement (inches) |
| --- | --- |
| 5200 | 0.161 |
| 6450 | 0.204 |
| 7700 | 0.303 |

It should be recognized that a load arm having a different cross-sectional area, length, and flexibility will have correspondingly different amounts of displacement associated with the amount of chain load.

Load arm 44 may also include a strain gauge associated therewith that, with accompanying software, could be used to determine the amount of chain tension. The amount of brake chain tension needed to close limited switch 50 is a function of the elastic properties of load arm 44 and the relative position of limit switch 50, i.e., the distance load arm 44 must deflect to contact limited switch 50. Accordingly, the predetermined amount of the force that will signal a full application of the brakes can be easily adjusted to by varying these factors according to user desires. Load arm 44 may comprise other biasing structure than can provide a force along arc Y-Y against movable sheave 36 so that when the tension in brake chain 22 is sufficient to overcome that force, limit switch 50 is triggered.

As further seen in FIG. 4, a cam 52 may be positioned at the slack end 40 of brake chain 22 for rotation as brake chain 22 is taken up or let out by drum 20. When slack is let out by drum 20 to release the brakes, cam 52 will rotate into engagement with another limit switch 54, thereby closing limit switch 54 to generate an electrical signal indicating that the brakes have been fully released. As a safety check, the electrical current used by motor 14 during a brake application or release may be monitored to detect any failure of limit switch 50 or limit switch 54.

Figure 5:
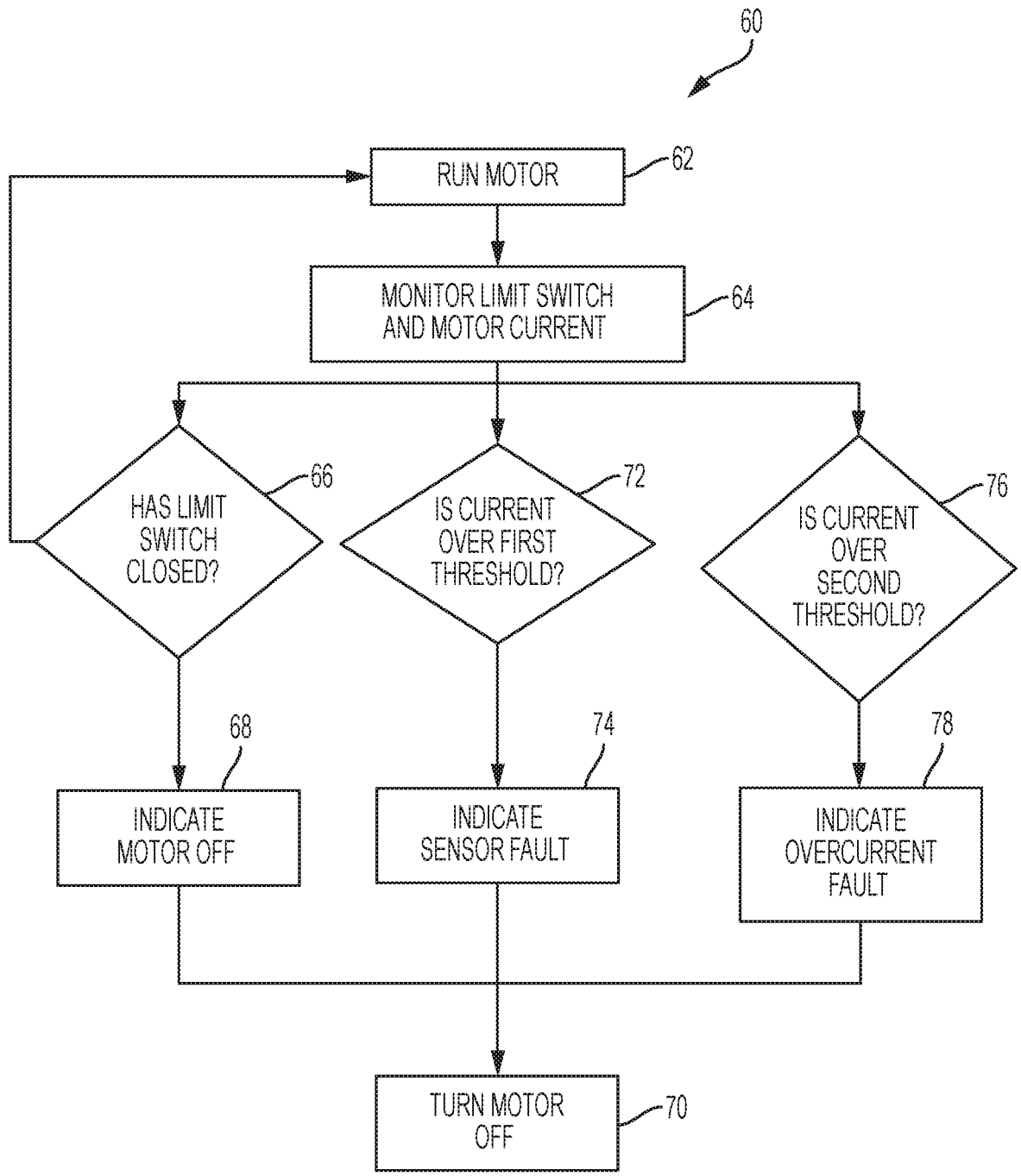
FIG. 5 is a flowchart of a brake chain tension control method for a motorized locomotive parking brake according to the present invention.

Referring to FIG. 5, a method 60 of setting a motorized locomotive handbrake begins with the step of motor 14 being run 62. After motor is run 62, input signals from limit switch 50 and any current sensor associated with motor 14 are monitored 64. A first check 66 is then performed to determine if brake chain 22 is already at the desired force, i.e., limit switch 50 has been closed by movement of load arm 44. If switch 50 has closed, an indication is provided that the motor 14 is turned off 68 and motor 14 is turned off 70. If check 66 does not indicate that switch 50 has closed, motor 14 continues to run at step 62 to take up more brake chain 22 and thus increase the force on brake chain 22. If system 10 includes monitoring of current to motor 14, method 60 may further comprise performing a check 72 to determine whether the current being drawn by motor 14 has exceeded a first threshold selected to indicate that sufficient force has been applied to brake chain 22. If so, an indication is provided that sensor 50 is faulty 74 and motor 14 is stopped 70. The current to motor 14 may also be the subject a separate check 76 to determine whether the current to motor 14 has exceeded a second threshold selected to indicate a more global failure in brake system 10, such as a failure of motor 14 (or any related electronics), the mechanical components of brake 10, or even the braking system of the locomotive or railcar. If so, an overcurrent fault is indicated 78 and motor is turned off 70. Thus, the two inputs to method 60 are the binary signal from switch 50 indicating that the brake is fully applied (or not) and a measurement of the amount of current being driven into motor 14. Method 60 may also implement a similar check of limit switch 54 to determine whether it has failed based on the absence of a signal when motor current indicates a brake release operation has been completed. Thus, brake 10 has redundancies for both apply and release where brake 10 can constantly check to make sure sensors are operating correctly. It should be recognized that method 60 may be implemented via software in a programmable processor, by firmware, or by dedicated circuits that perform the specified functions or acts, or combination thereof.

Figure 6:
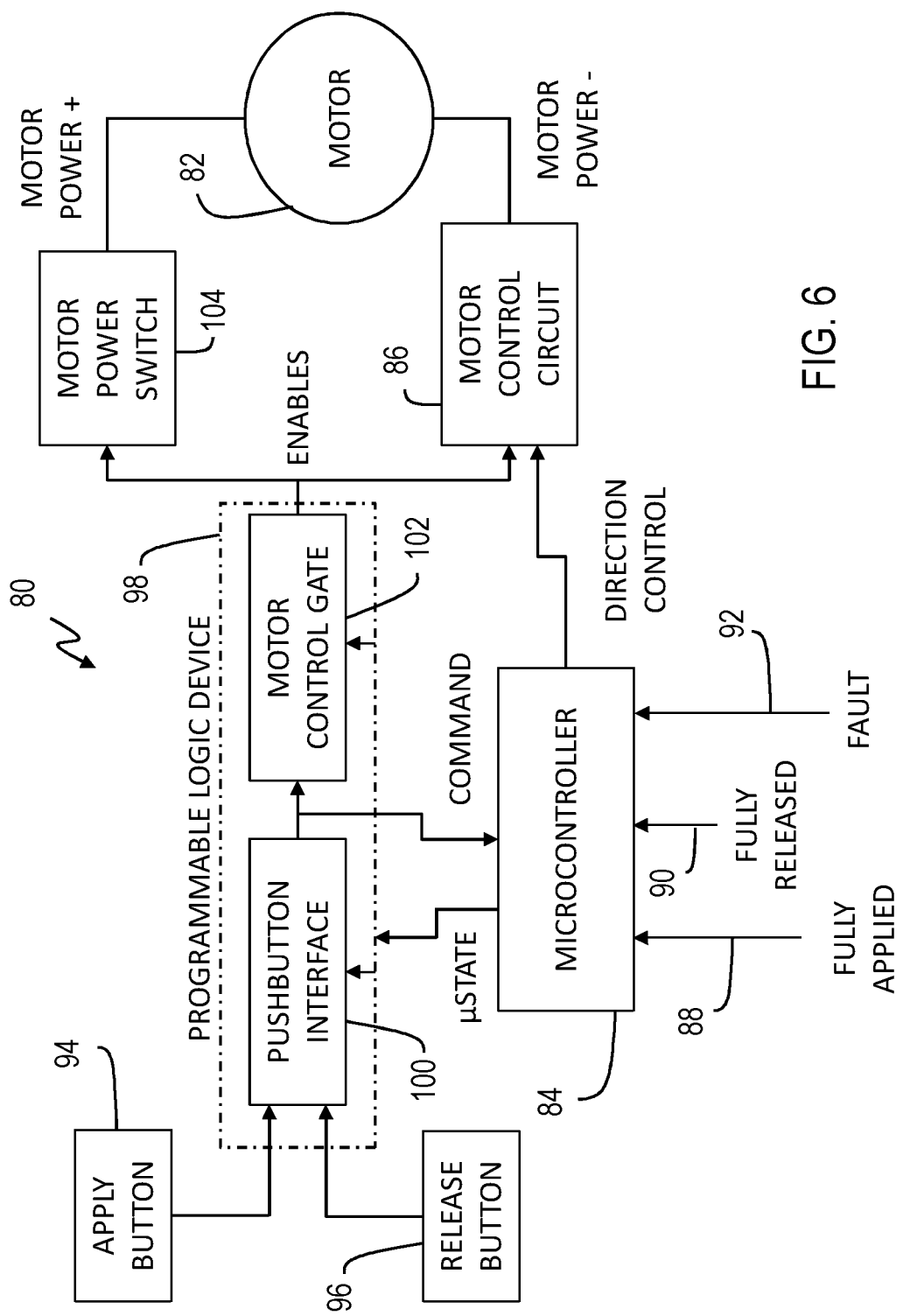
FIG. 6 is a schematic of an electronic control system for motorized locomotive parking brake according to the present invention.

Referring to FIG. 6, the electronic control system 80 for motorized locomotive parking brake 10 may be configured so that, under quiescent operating conditions, the supervisory electronics are disconnected from the drive motor 82 and therefore incapable of inadvertently causing drive motor 82 to engage and cause an un-commanded application or release of locomotive parking brake 10. More specifically, electronic control system 80 comprises a microcontroller 84 coupled to a motor control circuit 86 that can operate motor 82 in either direction, such as via an H-bridge electronic circuit, to apply and release locomotive parking brake 10. Microcontroller 84 also receives a fully applied signal 88, a fully released signal 90, and a fault signal 92 such as those described above as being provided by limit switches 50 and 54 and overcurrent fault 78 for the purposes of monitoring the status of locomotive parking brake 10.

Electronic control system 80 further comprises a human interface for receiving manual operation commands, such as an apply button 94 and a release button 96, that are interconnected to a programmable logic device (PLD) 98 having a pushbutton interface module 100 for the interpreting any signals provided by apply button 94 and release button 96 outputting a corresponding command to microcontroller 84. For example, signals sent by apply button 94 and release button 96 signals may be provided to a state machine programmed to implement pushbutton interface 100 of PLD 98 as is known in the art. PLD 98 is further programmed to include a motor control gate 102 that can selectively enable motor control circuit 86 and a motor power switch 104 that can selectively provide power to motor 82.

Pushbutton interface 100 of PLD 98 is configured to have four states: None, Apply, Release and Stop. Pushbutton interface 100 is preferably configured to be in the None state on power up and as a default return. Pushbutton interface 100 will transition to the Apply state when apply button 94 is depressed such that the input signal to pushbutton interface 100 transitions from low to high for greater than a first predetermined about of time, such as 170 milliseconds, and then back to low within a second predetermined time, such as 30 seconds. Upon this occurrence, a corresponding command is sent to microcontroller 84 and motor control gate 102. Pushbutton interface 100 may then return to the None state if the signal from apply button 94 remains low for a third predetermined time, such as one second, or microcontroller 84 signals that it has commanded operation of motor 82.

When motor control gate 102 receives an apply command from pushbutton interface 100, it closes a switch that selectively allows power to be applied to motor 82. Motor control gate 102 also enables motor control circuit 86. When microcontroller 84 receives an apply command from pushbutton interface 100, microcontroller 84 transitions from a stopped state to an applying state. The applying state is fed from microcontroller 84 to both portions of PLD 98.

In the applying state, microcontroller 84 drives motor control circuit 86 so the motor 82 operates in the apply direction and checks for a fully applied signal, a fault, or a stop command from pushbutton interface 100. When a fully applied signal, a fault condition, or a stop command from pushbutton input interface state machine is detected by microcontroller 84, microcontroller 84 transitions from the applying state to the stopped state. In the stopped state, microcontroller 84 stopes driving of motor 82 with motor control circuit 86. The stopped state is communicated to motor control gate 102, which in turn disables motor control circuit 86 and disconnects the path of power to motor 82 with motor power switch 104. Motor control gate 102 can disconnect itself and microcontroller 84 from powering and driving motor 82 on receiving a stop command from the state machine of pushbutton interface 100 as well as after a timeout period, such as 480 seconds, regardless of the state of microcontroller 84. Push button interface 100 will transition to the release state when release button 96 input signal transitions from low to high for greater than the first predetermined time period, such as 170 milliseconds, and then back to low within the second predetermined time, such as 30 seconds. This event will result in the sending of a release command to microcontroller 84 and motor control gate 102. Pushbutton interface 100 will transition back to a none state when release button 96 is low for the third predetermined period, such as one second, or the state machine of microcontroller 84 signals a release state.

When motor control gate 102 receives a release command from pushbutton interface 100, it operates motor power switch 104 to allow power to be applied to motor 82. Motor control gate 102 also enables motor control circuit 86. When microcontroller 84 receives a release command from pushbutton interface 100, microcontroller 84 transitions from the stopped state to a releasing state. In the releasing state, microcontroller 84 drives motor control circuit 86 in the release direction and checks for a fully released signal, a fault signal, or a stop command from pushbutton interface 100. When a fully released signal, a fault signal, or a stop command from pushbutton input interface 100 received by microcontroller 84 it transitions from the releasing state to a stopped state. In the stopped state, microcontroller 84 stops driving motor 82 via motor control circuit 86. The stopped state is also communicated to motor control gate 102 which disables motor control circuit 86 and disconnects the path of power to motor 82 using motor power switch 104. Motor control gate 102 will also disconnect itself and microcontroller 84 from powering and driving motor 82 upon receipt of a stop command from pushbutton interface 100 as well as after a timeout period, such as 480 seconds, regardless of the state of the microcontroller 84.

Pushbutton interface 100 issues a stop command if pushbutton interface 100 is in the apply state or release state and the apply button or release button input signal goes high for greater than a fourth predetermined time, such as 80 milliseconds. Pushbutton interface 100 also issues a stop command if pushbutton interface 100 is in the none state, microcontroller 84 is in the applying or releasing state, and the apply button or release button input signal goes high for greater than the fourth predetermined time, such as 80 milliseconds.

Thus, interpretation of operator commands to apply, release or stop the locomotive parking brake 10 is handled external to microcontroller 84 and only when a valid operator command to apply or release is detected will microcontroller 84 be allowed to control motor 82. Once microcontroller 84 begins to control the motor, it is only granted control for a maximum amount of time or until the operator commands a stop.

As described above, the present invention may be a system, a method, and/or a computer program associated therewith and is described herein with reference to flowcharts and block diagrams of methods and systems. The flowchart and block diagrams illustrate the architecture, functionality, and operation of possible implementations of systems, methods, and computer programs of the present invention. It should be understood that each block of the flowcharts and block diagrams can be implemented by computer readable program instructions in software, firmware, or dedicated analog or digital circuits. These computer readable program instructions may be implemented on the processor of a general purpose computer, a special purpose computer, or other programmable data processing apparatus to produce a machine that implements a part or all of any of the blocks in the flowcharts and block diagrams. Each block in the flowchart or block diagrams may represent a module, segment, or portion of instructions, which comprises one or more executable instructions for implementing the specified logical functions. It should also be noted that each block of the block diagrams and flowchart illustrations, or combinations of blocks in the block diagrams and flowcharts, can be implemented by special purpose hardware-based systems that perform the specified functions or acts or carry out combinations of special purpose hardware and computer instructions.

What is claimed is:

1. A method of controlling a parking brake, comprising:
providing a motorized parking brake having a motor, a brake chain drum interconnected to the motor to take up or release a brake chain, a load arm that is deflected based on tension in the brake chain to close a first switch, a cam coupled to a first end of the brake chain for rotation when the brake chain is taken up or released by the brake chain drum, and a second switch associated with the cam so that when the brake chain drum drives the brake chain into a fully released position the cam closes the second switch;
checking for a first signal from the first switch indicating that the brake chain in under a predetermined level of tension;
receiving a second signal from the motor indicating an amount of current being provided to the motor; and
stopping the motor if the first signal is received or if the second signal indicates that the amount of current being provided to the motor is over a predetermined threshold.

2. The method of claim 1, further comprising the step of stopping the motor if the amount of current being provided to the motor exceeds a second threshold.

3. The method of claim 2, wherein the motorized parking brake further includes a first sheave that engages the brake chain and moves away from the brake chain into the load arm in response to tension in the brake chain.

4. The method of claim 3, wherein the motorized parking brake further includes a second sheave positioned apart from and in alignment with the brake chain drum to define a section of brake chain therebetween that engages the first sheave.

5. The method of claim 4, wherein the brake chain extends from the first end over the brake chain drum and between the first and second sheaves to a second end for coupling to a brake rigging of a railway vehicle.

\* \* \* \* \*